US008773358B2

(12) United States Patent
Rubanovich et al.

(10) Patent No.: US 8,773,358 B2
(45) Date of Patent: Jul. 8, 2014

(54) HANDHELD ELECTRONIC DEVICE AND ASSOCIATED METHOD PROVIDING ADVANCED TEXT EDITING FUNCTION IN A TEXT DISAMBIGUATION ENVIRONMENT

(75) Inventors: Dan Rubanovich, Waterloo (CA); Vadim Fux, Waterloo (CA); Jason T. Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 1058 days.

(21) Appl. No.: 11/848,867

(22) Filed: Aug. 31, 2007

(65) Prior Publication Data
US 2009/0058814 A1    Mar. 5, 2009

(51) Int. Cl.
*G06F 3/02* (2006.01)
*G09G 5/00* (2006.01)

(52) U.S. Cl.
USPC ........................................... 345/169

(58) Field of Classification Search
None
See application file for complete search history.

(56) References Cited

U.S. PATENT DOCUMENTS

| | | | |
|---|---|---|---|
| 5,059,965 A | 10/1991 | Geiser | |
| 5,952,942 A | 9/1999 | Balakrishnan et al. | |
| 6,340,967 B1 * | 1/2002 | Maxted | 345/179 |
| 6,587,132 B1 * | 7/2003 | Smethers | 715/858 |
| 6,952,805 B1 * | 10/2005 | Tafoya et al. | 715/739 |
| 7,443,399 B2 * | 10/2008 | Hama | 345/467 |
| 7,683,885 B2 | 3/2010 | Fux et al. | |
| 2002/0066652 A1 | 6/2002 | Lee | |
| 2003/0017844 A1 * | 1/2003 | Yu | 455/556 |
| 2006/0007121 A1 | 1/2006 | Fux et al. | |
| 2006/0044278 A1 * | 3/2006 | Fux et al. | 345/168 |
| 2006/0058995 A1 * | 3/2006 | Fux et al. | 704/9 |
| 2006/0158428 A1 * | 7/2006 | Lazaridis et al. | 345/157 |
| 2007/0239427 A1 * | 10/2007 | Fux et al. | 704/3 |
| 2008/0001785 A1 * | 1/2008 | Elizarov et al. | 341/22 |
| 2008/0316212 A1 * | 12/2008 | Kushler | 345/467 |

FOREIGN PATENT DOCUMENTS

| | | |
|---|---|---|
| CN | 1184969 A | 6/1998 |
| DE | 37 12 360 A1 | 10/1988 |
| EP | 0 645 604 A1 | 6/2008 |

(Continued)

OTHER PUBLICATIONS

IBM Technical Disclosure, "Cursor Control Method for Formula Editing", IBM Corp., (Jul. 1998), vol. 31, No. 2, Armonk, New York.

(Continued)

*Primary Examiner* — Amare Mengistu
*Assistant Examiner* — Antonio Xavier
(74) *Attorney, Agent, or Firm* — Finnegan, Henderson, Farabow, Garrett & Dunner LLP (57) ABSTRACT

An improved handheld electronic device and associated method provide an advanced editing feature and an improved learning feature that are provided in a disambiguation environment. The advanced editing feature advantageously enables a new word that has been incorrectly disambiguated by a disambiguation routine to be readily corrected by the user without requiring the incorrectly disambiguated word to be deleted and retyped. Rather, the advanced editing feature enables the incorrectly disambiguated characters to be replaced with opposite characters on the same keys, and such changes can be accomplished merely through the use of inputs to a track ball. The newly edited word can then be learned by a learning database. The improved learning function advantageously favors words that are learned using the advanced editing feature over words that have been learned in other fashions.

12 Claims, 8 Drawing Sheets

(56) References Cited

FOREIGN PATENT DOCUMENTS

| JP | 05303468 | | 11/1993 |
|---|---|---|---|
| JP | 2002150890 | A1 | 5/2002 |
| JP | 2006197193 | A1 | 7/2006 |

OTHER PUBLICATIONS

Office Action, dated Jan. 26, 2011, mailed by Canadian Intellectual Property Office, in Canadian Patent Application No. 2,639,215 (3 pages).

Office Action dated Aug. 5, 2011 mailed by Mexican institute of Industrial Property, Mexican Patent Application No. MX/a/2008/011188 (2 pages); with translation (2 pages).

Official Action mailed on Mar. 2, 2011, in Japanese Patent Application No. 2008-222470 (4 pages); with translation (5 pages).

Office Action dated Nov. 21, 2011, mailed by Canadian Intellectual Property Office, in corresponding Canadian Patent Application No. 2,639,215.

Chinese Office Action in corresponding Chinese Patent Application No. 200810215132.0, dated Jun. 20, 2012.

Office Action from Chinese State Intellectual Property Office, dated Jan. 29, 2013, for corresponding Chinese Application No. 200810215132.0 (with English Translation).

Office Action from Chinese State Intellectual Property Office, dated Jul. 19, 2013, for corresponding Chinese Application No. 200810215132.0, with English translation (13 pages).

\* cited by examiner

HANDHELD ELECTRONIC DEVICE AND ASSOCIATED METHOD PROVIDING ADVANCED TEXT EDITING FUNCTION IN A TEXT DISAMBIGUATION ENVIRONMENT

BACKGROUND

1. Field

The disclosed and claimed concept relates generally to handheld electronic devices and, more particularly, to a handheld electronic device and method that provide an advanced text editing function in a text disambiguation environment.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

In order to reduce their size, some handheld electronic devices have been provided with keypads wherein at least some of the keys each have a plurality of characters such as Latin letters assigned thereto. During a text entry operation or other operation using such a keypad, an actuation of a key having a plurality of characters assigned thereto will be ambiguous. Such devices are usually configured with some type of disambiguation routine that is executable thereon and that resolves the ambiguity of the input. Disambiguation routines can include multi-tap routines and dictionary-based routines, by way of example.

Dictionary-based disambiguation routines have been generally effective for their intended purposes but have not been without limitation. A dictionary ultimately possesses a limited number of words that can be used to disambiguate an ambiguous text input. While it is known to provide data structures that can learn new words that the user has input, such learning databases typically do not assist with the actual inputting of the new words. It is generally understood that the inputting of a new word on a handheld electronic device having a reduced keyboard requires significantly more concentration and effort than the inputting of a word that is already known to the device. For instance, with each keystroke a user typically must carefully examine the proposed disambiguated interpretations of the ambiguous input and choose the one that correctly reflects the user's intended input, if such an interpretation is available. If the user tries to enter a word not knowing that it is not already stored on the handheld electronic device, the proposed disambiguated interpretations of the ambiguous input typically will be quite different than the input intended by the user. In such a situation, the user oftentimes must delete most or all of the typed word and retype the word while carefully selecting for each keystroke the desired disambiguated interpretation, as mentioned above. It thus would be desirable to provide an improved handheld electronic device and method that overcome these and other shortcomings.

BRIEF DESCRIPTION OF THE DRAWINGS

A full understanding of the disclosed and claimed concept can be gained from the following Description when read in conjunction with the accompanying drawings in which:

Similar numerals refer to similar parts throughout the specification.

DESCRIPTION

Figure 1:
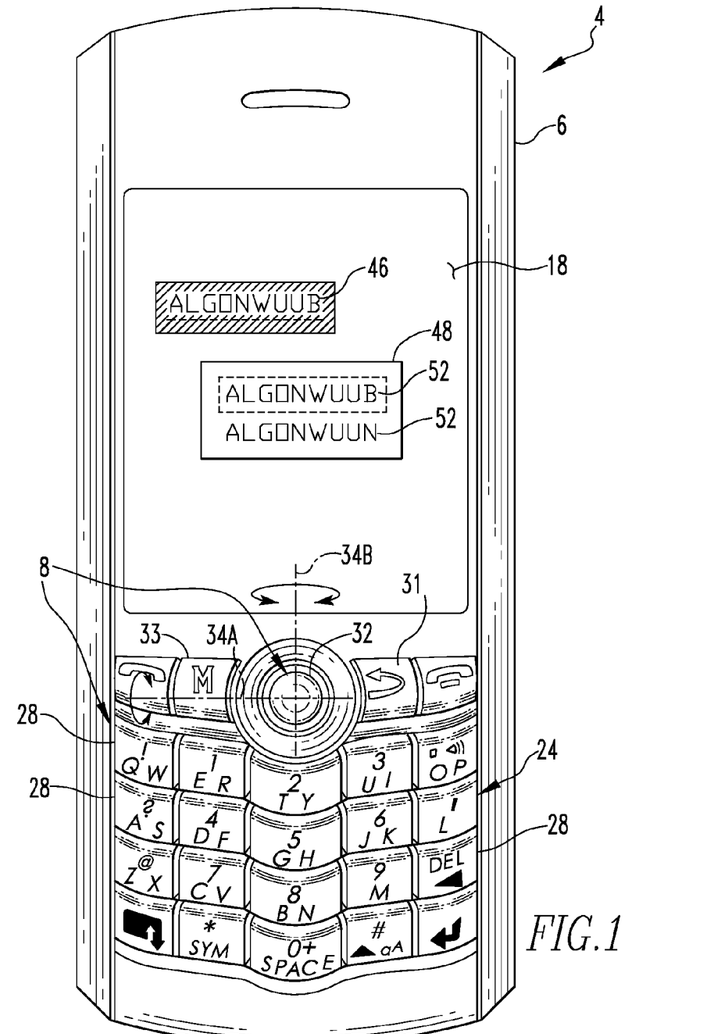
FIG. 1 is a top plan view of an improved handheld electronic device in accordance with the disclosed and claimed concept.
Figure 2:
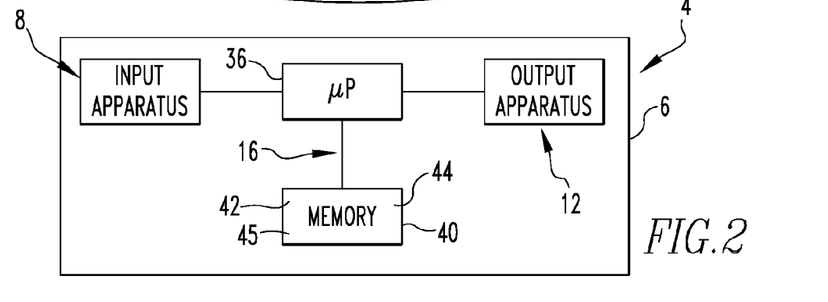
FIG. 2 is a schematic depiction of the improved handheld electronic device of FIG. 1.

An improved handheld electronic device 4 is indicated generally in FIG. 1 and is depicted schematically in FIG. 2. The exemplary handheld electronic device 4 includes a housing 6 upon which are disposed an input apparatus 8, an output apparatus 12, and a processor apparatus 16. The input apparatus 8 is structured to provide input to the processor apparatus 16, and the output apparatus 12 is structured to receive output signals from the processor apparatus 16. The output apparatus 12 comprises a display 18 that is structured to provide visual output, although other output devices such as speakers, LEDs, tactile output devices, and so forth can be additionally or alternatively used.

As can be seen in FIG. 2, the processor apparatus 16 comprises a processor 36 and a memory 40. The processor 36 may be, for instance and without limitation, a microprocessor (µP) that is responsive to inputs from the input apparatus 8 and that provides output signals to the output apparatus 12. The processor 36 interfaces with the memory 40.

The memory 40 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein a number of routines 44 which are executable on the processor 36. As employed herein, the expression "a number of" and variations thereof shall refer broadly to any non-zero quantity, including a quantity of one. The routines 44 can be in any of a variety of forms such as, without limitation, software, firmware, and the like. As will be explained in greater detail below, the routines 44 include a text disambiguation routine 44, as well as other routines. The memory 40 also has stored therein a dictionary 42, a learning database 45, and other linguistic data sources that are used by the disambiguation routine 44 to provide responses to ambiguous text inputs.

As can be understood from FIG. 1, the input apparatus 8 includes a keypad 24 and a multiple-axis input device which, in the exemplary embodiment depicted herein, is a track ball 32 that will be described in greater detail below. The keypad 24 comprises a plurality of keys 28 in the exemplary form of a reduced QWERTY keyboard, meaning that at least some of the keys 28 each have a plurality of characters assigned thereto, with at least some of the characters being Latin letters arranged generally in a QWERTY configuration. The keys 28 and the track ball 32 all serve as input members that are actuatable to provide input to the processor apparatus 16. The keypad 24 and the track ball 32 are advantageously disposed adjacent one another on a front face of the housing 6. This enables a user to operate the track ball 32 substantially without moving the user's hands away from the keypad 24 during a text entry operation or other operation.

Figure 5:
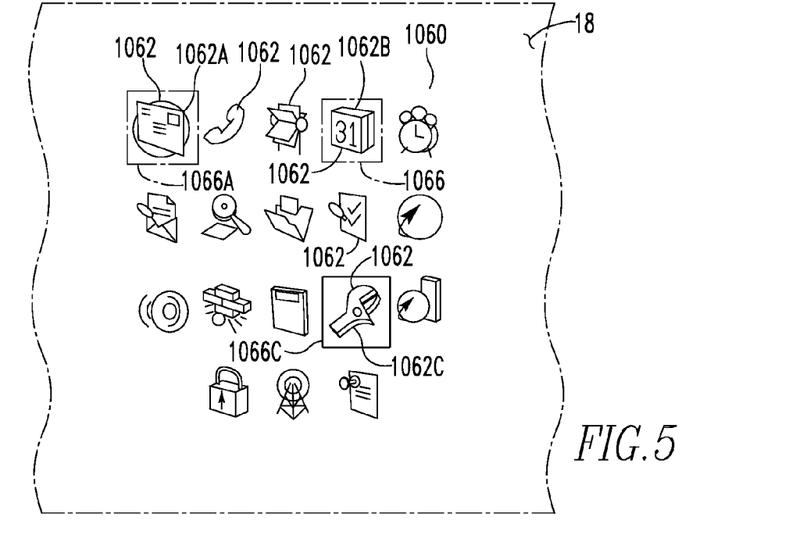
FIG. 5 is an exemplary home screen that can be visually output on the handheld electronic device.

One of the keys 28 is an <ESCAPE> key 31 which, when actuated, provides to the processor apparatus 16 an input that undoes the action which resulted from the immediately preceding input and/or moves the user to a logically higher position within a logical menu tree managed by a graphical user interface (GUI) routine 44. The function provided by the <ESCAPE> key 31 can be used at any logical location within any portion of the logical menu tree except, perhaps, at a home screen such as is depicted in FIG. 5. The <ESCAPE> key 31 is advantageously disposed adjacent the track ball 32 thereby enabling, for example, an unintended or incorrect input from the track ball 32 to be quickly undone, i.e., reversed, by an actuation of the adjacent <ESCAPE> key 31.

Figure 9:
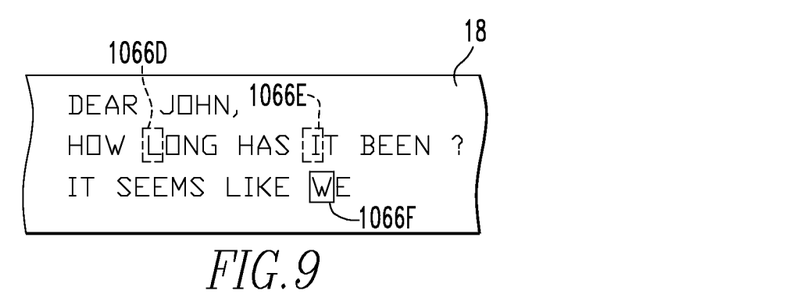
FIG. 9 is an output such as could occur during another exemplary text entry or text editing operation.

Another of the keys 28 is a <MENU> key 33 which, when actuated, provides to the processor apparatus 16 an input that causes the GUI 44 to generate and output on the display 18 a menu such as is depicted in FIG. 9. Such a menu is appropriate to the user's current logical location within the logical menu tree, as will be described in greater detail below.

While in the depicted exemplary embodiment the multiple-axis input device is the track ball 32, it is noted that multiple-axis input devices other than the track ball 32 can be employed without departing from the present concept. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals.

The track ball 32 is freely rotatable in all directions with respect to the housing 6. A rotation of the track ball 32 a predetermined rotational distance with respect to the housing 6 provides an input to the processor apparatus 16, and such inputs can be employed by the routines 44, for example, as navigational inputs, scrolling inputs, selection inputs, and other inputs.

For instance, and as can be seen in FIG. 1, the track ball 32 is rotatable about a horizontal axis 34A to provide vertical scrolling, navigational, selection, or other inputs. Similarly, the track ball 32 is rotatable about a vertical axis 34B to provide horizontal scrolling, navigational, selection, or other inputs. Since the track ball 32 is freely rotatable with respect to the housing 6, the track ball 32 is additionally rotatable about any other axis (not expressly depicted herein) that lies within the plane of the page of FIG. 1 or that extends out of the plane of the page of FIG. 1.

The track ball 32 can be said to be a multiple-axis input device because it provides scrolling, navigational, selection, and other inputs in a plurality of directions or with respect to a plurality of axes, such as providing inputs in both the vertical and the horizontal directions. It is reiterated that the track ball 32 is merely one of many multiple-axis input devices that could be employed on the handheld electronic device 4. As such, mechanical alternatives to the track ball 32, such as a joystick, might have a limited rotation with respect to the housing 6, and non-mechanical alternatives might be immovable with respect to the housing 6, yet all are capable of providing input in a plurality of directions and/or along a plurality of axes.

The track ball 32 additionally is translatable toward the housing 6, i.e., into the plane of the page of FIG. 1, to provide additional inputs. The track ball 32 could be translated in such a fashion by, for example, a user applying an actuating force to the track ball 32 in a direction toward the housing 6, such as by pressing on the track ball 32. The inputs that are provided to the processor apparatus 16 as a result of a translation of the track ball 32 in the indicated fashion can be employed by the routines 44, for example, as selection inputs, delimiter inputs, or other inputs.

An advanced editing function is advantageously provided on the handheld electronic device 4 by an editing routine 44 that is stored in the memory 40 and is executable on the processor 36. The editing routine 44 advantageously enables text to be edited with minimal effort by the user, typically by merely requiring inputs from the track ball 32 in order to edit text.

As can be seen in FIG. 1, the user is attempting to type the word "Algonquin", but it is clear that the desired word is not already stored in the dictionary 42 or the learning database 45. In so doing, the user has entered the key sequence <AS> <L> <GH> <OP> <BN> <QW> <UI> <UI> <BN>, and the disambiguation routine 44 was unable to find a matching word on the handheld electronic device 4. The GUI 44 has output a text input component 46 displaying the proposed disambiguated interpretation 52 "ALGONWUUB", which is not what the user intended. The GUI 44 has also output a lookup component 48 that includes as a default input the aforementioned disambiguated interpretation 52 "ALGONWUUB" as well as another proposed disambiguated interpretation 52 "ALGONWUUN". If during the current word entry session the user realizes that the desired word "Algonquin" it is not already stored on the handheld electronic device 4, the user may advantageously employ the aforementioned editing routine 44 to change the input.

Figure 3:
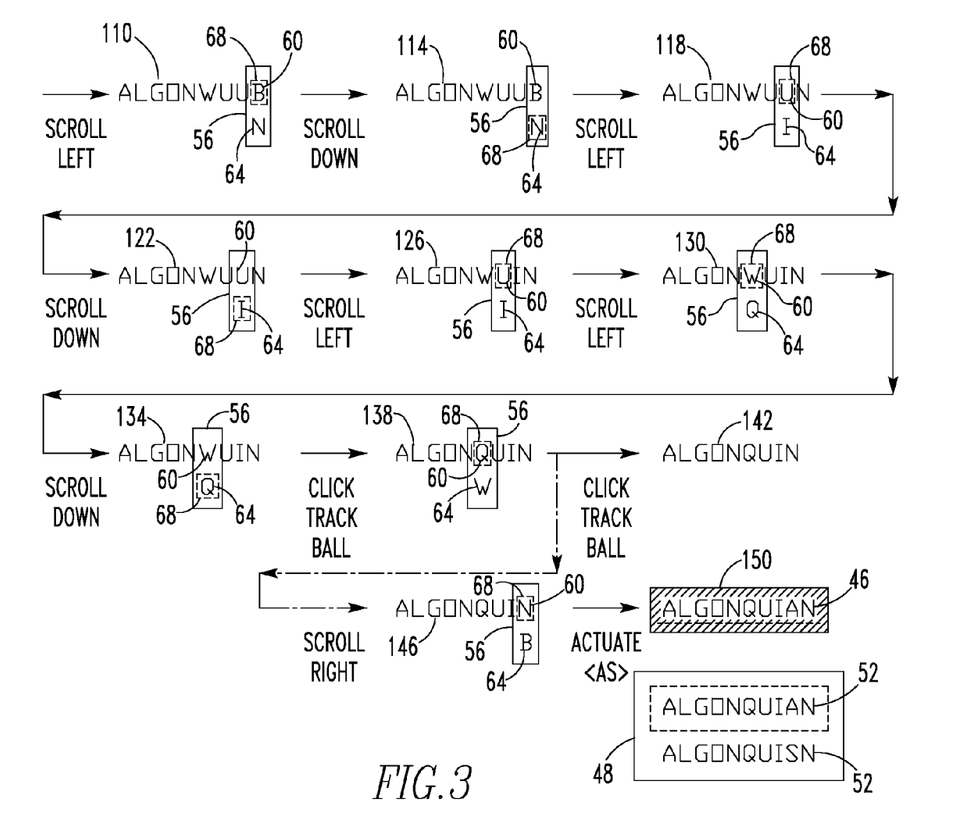
FIG. 3 is a stepwise depiction of an exemplary text editing operation.

FIG. 3 depicts an exemplary text editing operation that employs the editing routine 44. During the entering of text, the user can activate the edit mode on the handheld electronic device 4 by providing a leftward scrolling input with the track ball 32. As such, if the user begins with the output as depicted in FIG. 1 and provides a scroll in the leftward direction with the track ball 32, the editing routine 44 will be activated, and the output on the display 18 will be changed to appear as at the numeral 110 in FIG. 3. In particular, it can be seen that the misspelled word "ALGONWUUB" is output as a displayed object on the display 18, and a box 56 is depicted as extending around a current character 60 "B" as well as an opposite character 64 "N". As can be understood from FIG. 1, the characters "B" and "N" are assigned to the same key 28 and are thus considered to be opposite characters. In the event that any given key had more than two characters assigned thereto, the box 56 would enclose both the current character 60 as well as a plurality of characters opposite thereto, all of which would be assigned to the same key.

As can be further be seen at the numeral 110 in FIG. 3, the current character 60 "B" has a highlight 68 initially applied thereto. At the beginning of the editing operation, the opposite character "N" is not highlighted. The box 56 and the highlight 68 together indicate to a user the subject of an edit focus of the processor apparatus 16. Specifically, the box 56 indicates to a user the character grouping that is currently the subject of the editing routine 44. The highlight 68 indicates to a user the character within the box 56 that is currently active, meaning the character to which inputs from the track ball 32 will be directed.

As mentioned above, the current character 60 "B" is highlighted when the editing operation begins. In the exemplary method depicted herein, the character "B" is the terminal character of the word being edited "ALGONWUUB". It is understood, however, that in other forms the initial character or another character of the word being edited could be the subject of the edit focus when the editing routine 44 is first initiated without departing from the present concept.

As can be understood at the numeral 114, a scrolling input in a downward direction with the track ball 32 causes the highlight 68 to be shifted to the opposite character 64 "N", meaning that the opposite character 64 "N" is the active character and will be the subject of whatever inputs are received from the track ball 32.

As can be seen at the numeral 118, the user has provided a leftward scrolling input with the track ball 32, and this has resulted in the character "B" being replaced with the character "N". It can further be seen that the box 56 now encloses the current character 60 "U" and the opposite character 64 "I". It therefore can be understood that the leftward scrolling input between the numerals 114 and 118 caused the character "B" to be replaced with the then-active character "N", and additionally moved the edit focus one character leftward in the word being edited.

It is noted that if instead of entering a leftward scrolling input with the track ball between 114 and 118 the user had actuated the track ball 32 by pressing it in a direction generally toward the housing 6, i.e., providing a "click" of the track ball 32, the character "B" would still have been replaced with the character "N". However, in such a situation the edit focus of the processor apparatus 16 would not have been shifted leftward to the adjacent character, and rather would have stayed on the character pair "N" and "B", as will be described in further detail below.

Between 118 and 122, the user has again scrolled downward with the track ball, thereby making the opposite character 64 "I" the active character. By again scrolling leftward between the numerals 122 and 126, the user has caused the current character 60 "U" to be replaced with the opposite character 64 "I" and has additionally shifted the edit focus of the processor apparatus 16 one character leftward to the current character 60 "U". However, it is noted that the current character 60 "U" at 126 is the correct character at this location if the user is seeking to type the word "Algonquin". The current character 60 "U" at 126 therefore does not need to be changed with its opposite character 64 "I", and the user therefore scrolls leftward again to shift the edit focus one character leftward to the active current character 60 "W" and the opposite character 64 "Q" at 130. Again, since at 126 the current character 60 "U" was the active character, and since between the numerals 126 and 130 the user entered a leftward scroll with the track ball 32 without previously having entered a downward scroll, the edit focus of the processor apparatus 16 was shifted leftward one character without performing a replacement of the then-current character 60 "U".

Between the numerals 130 and 134, the user has entered a downward scrolling input with the track ball 32, thereby causing the opposite character 64 "Q" to become the active character. Between the numerals 134 and 138 the user actuates or clicks the track ball 32 to cause the active opposite character 64 "Q" to replace the then-current character 60 "W". As can be further seen at the numeral 138, since the user clicked the track ball 32 rather than entered a scrolling input with the track ball 32, the edit focus of the processor apparatus 16 remains on the character pair "Q" and "W", i.e., the edit focus has not been shifted to an adjacent character. It is understood that at this point the user could again reverse the characters "Q" and "W" by scrolling downward with the track ball to make the opposite character 64 "W" the active character and by again actuating or clicking the track ball 32. However, since the word at the numeral 138 is the spelling intended by the user, the user can click the track ball 32 to exit the edit mode and return to text input mode, as at the numeral 142, with the correctly spelled word "Algonquin" being finalized.

The edit mode can be exited in any of a variety of fashions. The fashion mentioned above, wherein the user clicked the track ball while a current character 60, i.e., the current character 60 "U" was active, resulted in exiting from the edit mode since the click input was seen as a selection of a current character 60, thereby indicating to the processor apparatus 16 that editing was complete. Alternatively, the user could actuate the <ESCAPE> key 31 or could actuate an <ENTER> key or could provide some other appropriate input to exit the edit mode.

As an alternative to the user clicking the track ball 32 between the numerals 138 and 142 to exit the edit mode, the user may instead have decided to add another character to the edited word. For instance, the user may have determined that the more correct spelling of the desired word "Algonquin" actually was "Algonquian", i.e., with the letter "A" inserted to the left of the letter "N". From 138, therefore, the user enters a scrolling input in a rightward direction with the track ball 32 sufficiently to cause the edit focus to be moved to the active current character 60 "N" and the opposite character 64 "B". If at this point the user actuated the key 28 <AS>, the keystroke would be inserted in front of, i.e., to the left of, the current character 60 "N", and the edit mode would be exited. That is, any input other than an input from the track ball 32, i.e., an actuation of the key 28 <AS>, the edit mode will be exited. The text input mode will then become active on the handheld electronic device 4.

As can be seen at the numeral 150, the correctly spelled "Algonquian" has been output as a text input component 46, and the disambiguation routine 44 further has caused the outputting of a lookup component 48 that includes the aforementioned disambiguated interpretation 52 "Algonquian", as well as an alternate disambiguated interpretation 52 "Algonquisn". From the numeral 150, the user can continue with the typing of text such as in the situation prior to when the edit mode was entered at the numeral 110.

It thus can be seen that the advantageous advanced editing feature enables an incorrectly disambiguated word to be corrected merely by providing navigational inputs and actuation inputs with the track ball 32. For instance, and as was seen between the numerals 110 and 114, a downward scroll followed by a leftward scroll resulted in the current character 60 "B" being replaced with the opposite character 64 "N", and further resulted in the edit focus being shifted one character leftward. The leftward character was similarly replaced with a downward scroll followed by a leftward scroll which additionally shifted the edit focus one character further leftward. Alternatively, and as was depicted between the numerals 134 and 138, a current character 60 can be replaced with an active opposite character 64 merely by clicking the track ball 32.

The advanced editing function therefore advantageously enables an incorrect disambiguated interpretation 52, such as is output at a text input component 46, to be edited merely by providing scrolling and clicking inputs from the track ball 32.

An improved learning feature is also provided in conjunction with the advanced editing feature. The learning feature advantageously enables new words that have been entered using the advanced editing feature to be learned and to additionally be preferred over conflicting words that were learned by the learning database 45 in fashions other than through the use of the advanced editing feature. A word can be said to conflict with another word if the two words have different spellings but are generated from the same sequence of actuations of keys 28.

A word may have been learned by the learning database 45 other than through the advanced editing feature in numerous ways. For example, the word may have been parsed from text received on the handheld electronic device 4, or the word may have been entered by a user through the direct input method of checking the proposed disambiguated interpretations with each keystroke and selecting a disambiguation as needed to reflect the user's intended input. In the situation where two conflicting words are both words in the learning database 45, a potential exists that a user will repeatedly receive an undesired interpretation of the sequence of keys 28 that can generate both of the conflicting words.

In order to ameliorate this problem, any word that is learned by the learning database 45 through the use of the advanced editing feature will include a sticky flag which will prevent deletion of the new word from the learning database 45. Words that are learned by the learning database 45 through methods other than the advanced editing feature, such as those mentioned above, will be stored in the learning database 45 without a sticky flag. Thus, if any word in the learning database 45 is found to conflict with another word in the learning database 45, and only one of the conflicting words has a sticky flag, the conflicting word lacking the sticky flag will be deleted from the learning database 45. It is understood that the sticky flag mentioned herein is only one example of a predetermined characteristic that words which are learned through the use of the advanced editing feature can possess or can have applied thereto and which words otherwise learned will lack. Other predetermined characteristics that are possessed by words learned through the use of the advanced editing feature and that are lacked by words otherwise learned can be employed in determining whether a conflicting word should be deleted from the learning database 45. Alternatively, the predetermined characteristic could be absent from words learned through the use of the advanced editing feature and could instead be applied to words otherwise learned and still achieve the same result.

Figure 4:
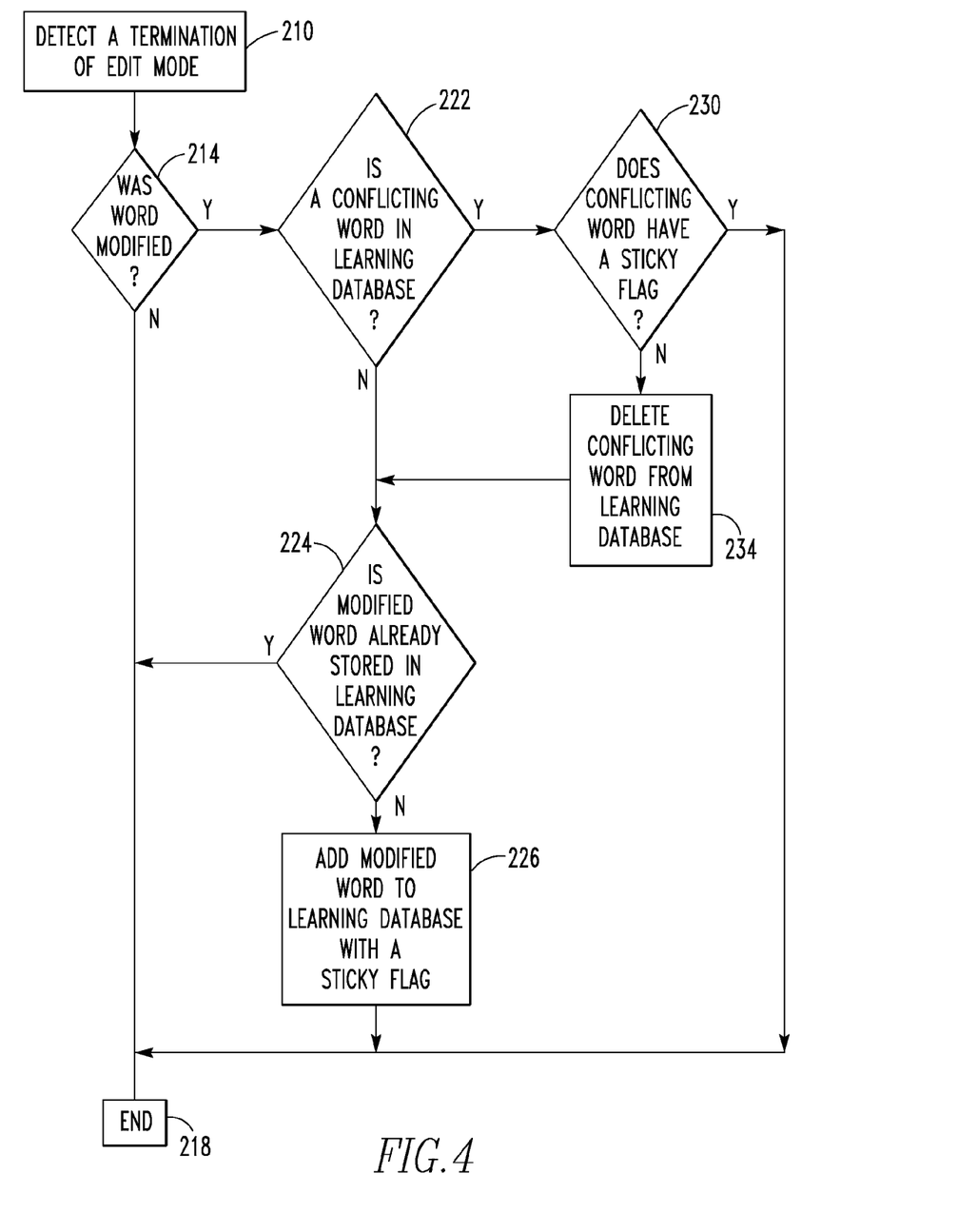
FIG. 4 is a flowchart depicting portions of an improved method in accordance with the disclosed and claimed concept.

An exemplary flowchart depicting certain aspects of the improved learning method is shown generally in FIG. 4. It is first detected, as at 210, that the edit mode is being terminated. It is thereafter determined, as at 214, whether the word being edited was actually modified. If no modification occurred, processing continues, as at 218, where the learning process terminates. However, if it is determined at 214 that the word that was the subject of the advanced editing feature actually was modified, it is then determined, as at 222, whether a conflicting word is already stored in the learning database 45. If no such conflicting word is identified at 222 in the learning database 45, processing continues at 224 where it is determined whether the newly modified word is already stored in the learning database 45. For instance, the newly modified word might already be stored in the learning database 45 but might be inactive or only partially active due to infrequent use, for example. If the newly modified word is already stored in the learning database 45, processing continues, as at 218, where the learning process terminates. Otherwise, the newly modified word is stored, as at 226, in the learning database 45 with a sticky flag. Processing thereafter continues to 218 where the learning process is terminated.

On the other hand, if it is determined at 222 that a conflicting word is already stored in the learning database 45, it is then determined, as at 230, whether the conflicting word has a sticky flag. If the conflict word is determined at 230 to have a sticky flag, processing continues to 218 where the learning process terminates. However, if it is determined at 230 that the conflicting word does not have a sticky flag, processing continues, as at 234, where the conflicting word is deleted from the learning database 45. Processing thereafter continues, as at 224, where it can be determined whether or not the newly edited word has already been stored in the learning database 45.

The improved learning feature therefore enables words that have been generated by the advanced editing feature to be preferred over conflicting words that were learned in other fashions. This advantageously facilitates input on the handheld electronic device.

An exemplary home screen output that can be visually output on the display 18 is depicted in FIG. 5 as including a plurality of icons 1062 that are selectable by the user for the purpose of, for example, initiating the execution on the processor apparatus 16 of a routine 44 that is represented by an icon 1062. The track ball 32 is rotatable to provide, for example, navigational inputs among the icons 1062.

For example, FIG. 5 depicts the travel of an indicator 1066 from the icon 1062A, as is indicated in broken lines with the indicator 1066A, to the icon 1062B, as is indicated in broken lines with the indicator 1066B, and onward to the icon 1062C, as is indicated by the indicator 1066C. It is understood that the indicators 1066A, 1066B, and 1066C are not necessarily intended to be simultaneously depicted on the display 18, but rather are intended to together depict a series of situations and to indicate movement of the indicator 1066 among the icons 1062. The particular location of the indicator 1066 at any given time indicates to a user the particular icon 1062, for example, that is the subject of a selection focus of the handheld electronic device 4. Whenever an icon 1062 or other selectable object is the subject of the selection focus, a selection input to the processor apparatus 16 will result in execution or initiation of the routine 44 or other function that is represented by the icon 1062 or other selectable object.

The movement of the indicator 1066 from the icon 1062A, as indicated with the indicator 1066A, to the icon 1062B, as is indicated by the indicator 1066B, was accomplished by rotating the track ball 32 about the vertical axis 34B to provide a horizontal navigational input. As mentioned above, a rotation of the track ball 32 a predetermined rotational distance results in an input to the processor apparatus 16. In the present example, the track ball 32 would have been rotated about the vertical axis 34B a rotational distance equal to three times the predetermined rotational distance since the icon 62B is disposed three icons 1062 to the right the icon 1062A. Such rotation of the track ball 32 likely would have been made in a single motion by the user, but this need not necessarily be the case.

Similarly, the movement of the indicator 1066 from the icon 1062B, as indicated by the indicator 1066B, to the icon 1062C, as is indicated by the indicator 1066C, was accomplished by the user rotating the track ball 32 about the horizontal axis 34A to provide a vertical navigational input. In so doing, the track ball 32 would have been rotated a rotational distance equal to two times the predetermined rotational distance since the icon 1062C is disposed two icons 1062 below the icon 1062B. Such rotation of the track ball 32 likely would have been made in a single motion by the user, but this need not necessarily be the case.

It thus can be seen that the track ball 32 is rotatable in various directions to provide various navigational and other inputs to the processor apparatus 16. Rotational inputs by the track ball 32 typically are interpreted by whichever routine 44 is active on the handheld electronic device 4 as inputs that can be employed by such routine 44. For example, the GUI 44 that is active on the handheld electronic device 4 in FIG. 5 requires vertical and horizontal navigational inputs to move the indicator 1066, and thus the selection focus, among the icons 1062. If a user rotated the track ball 32 about an axis oblique to the horizontal axis 34A and the vertical axis 34B, the GUI 44 likely would resolve such an oblique rotation of the track ball 32 into vertical and horizontal components which could then be interpreted by the GUI 44 as vertical and horizontal navigational movements, respectively. In such a situation, if one of the resolved vertical and horizontal navigational movements is of a greater magnitude than the other, the resolved navigational movement having the greater magnitude would be employed by the GUI 44 as a navigational input in that direction to move the indicator 1066 and the selection focus, and the other resolved navigational movement would be ignored by the GUI 44, for example.

When the indicator 1066 is disposed on the icon 1062C, as is indicated by the indicator 1066C, the selection focus of the handheld electronic device 4 is on the icon 1062C. As such, a translation of the track ball 32 toward the housing 6 as described above would provide an input to the processor apparatus 16 that would be interpreted by the GUI 44 as a selection input with respect to the icon 1062C. In response to such a selection input, the processor apparatus 16 would, for example, begin to execute a routine 44 that is represented by the icon 1062C. It thus can be understood that the track ball 32 is rotatable to provide navigational and other inputs in multiple directions, assuming that the routine 44 that is currently active on the handheld electronic device 4 can employ such navigational or other inputs in a plurality of directions, and can also be translated to provide a selection input or other input.

Figure 6:
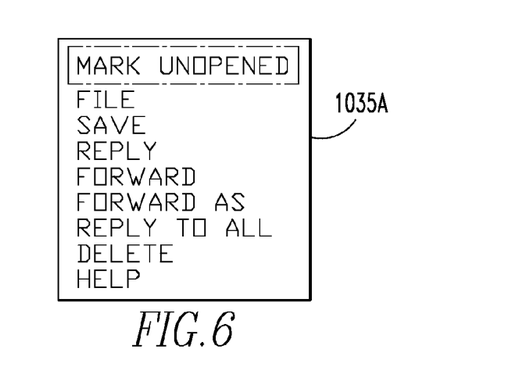
FIG. 6 depicts an exemplary menu that can be output on the handheld electronic device of FIG. 1.
Figure 7:
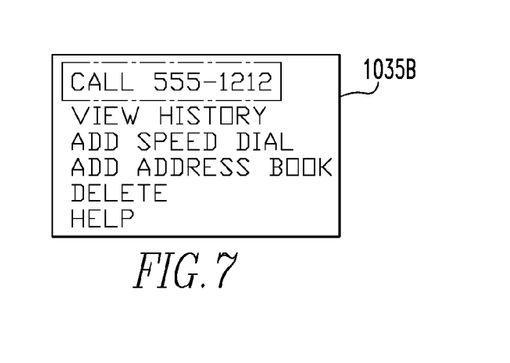
FIG. 7 depicts another exemplary menu.

As mentioned above, FIG. 6 depicts an exemplary menu 1035A that would be appropriate if the user's current logical location within the logical menu tree was viewing an email within an email routine 44. That is, the menu 1035A provides selectable options that would be appropriate for a user given that the user is, for example, viewing an email within an email routine 44. In a similar fashion, FIG. 7 depicts another exemplary menu 1035B that would be depicted if the user's current logical location within the logical menu tree was within a telephone routine 44.

Rotational movement inputs from the track ball 32 could be employed to navigate among, for example, the menus 1035A and 1035B. For instance, after an actuation of the <MENU> key 33 and an outputting by the GUI 44 of a resultant menu, the user could rotate the track ball 32 to provide scrolling inputs to successively highlight the various selectable options within the menu. Once the desired selectable option is highlighted, i.e., is the subject of the selection focus, the user could translate the track ball 32 toward the housing 6 to provide a selection input as to the highlighted selectable option. In this regard, it is noted that the <MENU> key 33 is advantageously disposed adjacent the track ball 32. This enables, for instance, the generation of a menu by an actuation the <MENU> key 33, conveniently followed by a rotation the track ball 32 to highlight a desired selectable option, for instance, followed by a translation of the track ball 32 toward the housing 6 to provide a selection input to initiate the operation represented by the highlighted selectable option.

It is further noted that one of the additional inputs that can be provided by a translation of the track ball 32 is an input that causes the GUI 44 to output a reduced menu. For instance, a translation of the track ball 32 toward the housing 6 could result in the generation and output of a more limited version of a menu than would have been generated if the <MENU> key 33 had instead been actuated. Such a reduced menu would therefore be appropriate to the user's current logical location within the logical menu tree and would provide those selectable options which the user would have a high likelihood of selecting. Rotational movements of the track ball 32 could provide scrolling inputs to scroll among the selectable options within the reduced menu 1035C, and translation movements of the track ball 32 could provide selection inputs to initiate whatever function is represented by the selectable option within the reduce menu 1035C that is currently highlighted.

Figure 8:
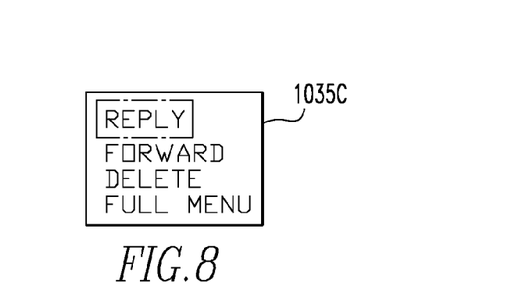
FIG. 8 depicts an exemplary reduced menu.

By way of example, if instead of actuating the <MENU> key 33 to generate the menu 1035A the user translated the track ball 32, the GUI 44 would generate and output on the display the reduced menu 1035C that is depicted generally in FIG. 8. The exemplary reduced menu 1035C provides as selectable options a number of the selectable options from the menu 1035A that the user would be most likely to select. As such, a user seeking to perform a relatively routine function could, instead of actuating the <MENU> key 33 to display the full menu 1035A, translate the track ball 32 to generate and output the reduced menu 1035C. The user could then conveniently rotate the track ball 32 to provide scrolling inputs to highlight a desired selectable option, and could then translate the track ball 32 to provide a selection input which would initiate the function represented by the selectable option in the reduced menu 1035C that is currently highlighted.

In the present exemplary embodiment, many of the menus that could be generated as a result of an actuation of the <MENU> key 33 could instead be generated and output in reduced form as a reduced menu in response to a translation of the track ball 32 toward the housing 6. It is noted, however, that a reduced menu might not be available for each full menu that could be generated from an actuation of the <MENU> key 33. Depending upon the user's specific logical location within the logical menu tree, a translation of the track ball 32 might be interpreted as a selection input rather than an input seeking a reduced menu. For instance, a translation of the track ball 32 on the home screen depicted in FIG. 1 would result in a selection input as to whichever of the icons 1062 is the subject of the input focus. If the <MENU> key 33 was actuated on the home screen, the GUI 44 would output a menu appropriate to the home screen, such as a full menu of all of the functions that are available on the handheld electronic device 4, including those that might not be represented by icons 1062 on the home screen.

FIG. 9 depicts a quantity of text that is output on the display 18, such as during a text entry operation or during a text editing operation, for example. The indicator 1066 is depicted in FIG. 9 as being initially over the letter "L", as is indicated with the indicator 1066D, and having been moved horizontally to the letter "I", as is indicated by the indicator 1066E, and thereafter vertically moved to the letter "W", as is indicated by the indicator 1066F. In a fashion similar to that in FIG. 5, the cursor 1066 was moved among the letters "L", "I", and "W" through the use of horizontal and vertical navigational inputs resulting from rotations of the track ball 32. In the example of FIG. 9, however, each rotation of the track ball 32 the predetermined rotational distance would move the indicator 1066 to the next adjacent letter. As such, in moving the indicator 1066 between the letters "L" and "I," the user would have rotated the track ball 32 about the vertical axis 1034B a rotational distance equal to nine times the predetermined rotational distance, for example, since "I" is disposed nine letters to the right of "L".

Figure 10:
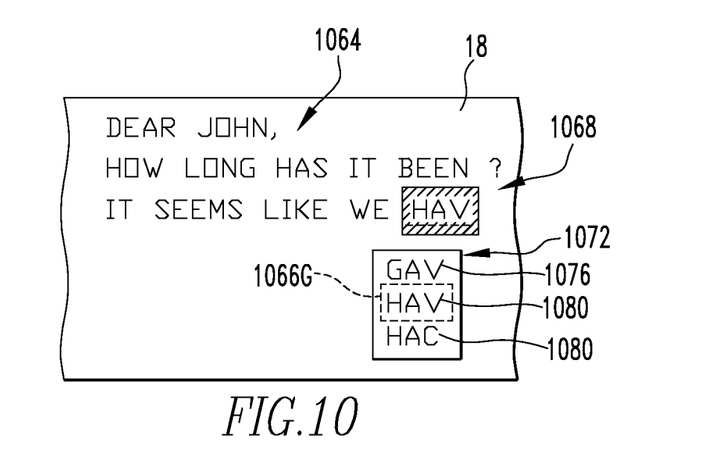
FIG. 10 is an output during another exemplary text entry operation.

FIG. 10 depicts an output 1064 on the display 18 during, for example, a text entry operation that employs the disambiguation routine 44. The output 1064 can be said to comprise a text component 1068 and a variant component 1072. The variant component 1072 comprises a default portion 1076 and a variant portion 1080. FIG. 10 depicts the indicator 1066G on the variant 1080 "HAV", such as would result from a rotation of the track ball 32 about the horizontal axis 34A to provide a downward vertical scrolling input. In this regard, it is understood that a rotation of the track ball 32 a distance equal to the predetermined rotational distance would have moved the indicator 1066 from a position (not expressly depicted herein) disposed on the default portion 1076 to the position disposed on the first variant 1080, as is depicted in FIG. 10. Since such a rotation of the track ball 32 resulted in the first variant 1080 "HAV" being highlighted with the indicator 1066G, the text component 1068 likewise includes the text "HAV" immediately preceding a cursor 1084A.

Figure 11:
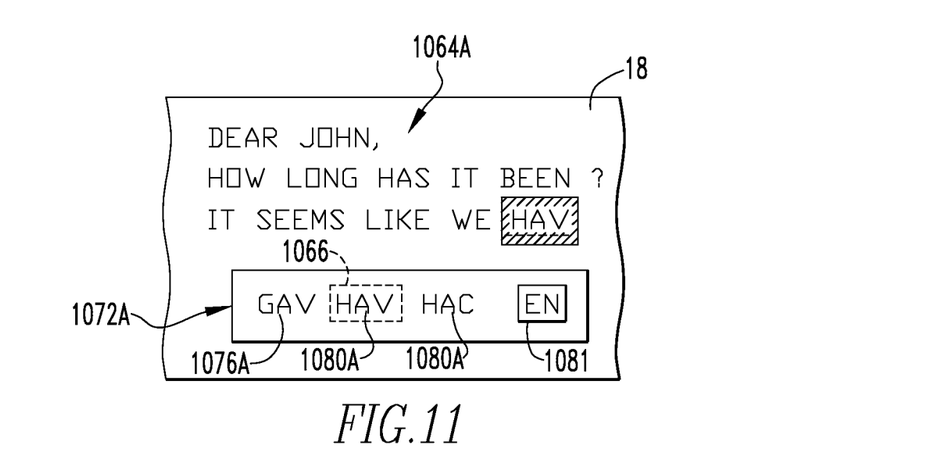
FIG. 11 is an alternative output during the exemplary text entry operation of FIG. 10.

FIG. 11 depict an alternative output 1064A having an alternative variant component 1072A having a default portion 1076A and a variant portion 1080A. The variant component 1072A is horizontally arranged, meaning that the default portion 1076A and the variants 1080A are disposed horizontally adjacent one another and can be sequentially selected by the user through the use of horizontal scrolling inputs, such as by the user rotating the track ball 32 the predetermined rotational distance about the vertical axis 34B. This is to be contrasted with the variant component 1072 of FIG. 10 wherein the default portion 1076 and the variants 1080 are vertically arranged, and which can be sequentially selected by the user through the user of vertical scrolling inputs with the track ball 32.

In this regard, it can be understood that the track ball 32 can provide both the vertical scrolling inputs employed in conjunction with the output 1064 as well as the horizontal scrolling inputs employed in conjunction with the output 1064A. For instance, the disambiguation routine 44 potentially could allow the user to customize the operation thereof by electing between the vertically arranged variant component 1072 and the horizontally arranged variant component 1072A. The track ball 32 can provide scrolling inputs in the vertical direction and/or the horizontal direction, as needed, and thus is operable to provide appropriate scrolling inputs regardless of whether the user chooses the variant component 1072 or the variant component 1072A. That is, the track ball 32 can be rotated about the horizontal axis 34A to provide the vertical scrolling inputs employed in conjunction with the variant component 1072, and also can be rotated about the vertical axis 34B to provide the horizontal scrolling inputs that are employed in conjunction with the variant component 1064A. The track ball 32 thus could provide appropriate navigational, strolling, selection, and other inputs depending upon the needs of the routine 44 active at any time on the handheld electronic device 4. The track ball 32 enables such navigational, strolling, selection, and other inputs to be intuitively generated by the user through rotations of the track ball 32 in directions appropriate to the active routine 44, such as might be indicated on the display 18.

It can further be seen from FIG. 11 that the variant component 1072A additionally includes a value 1081 that is indicative of the language into which the disambiguation routine 44 will interpret ambiguous text input. In the example depicted in FIG. 11, the language is English.

Figure 12:
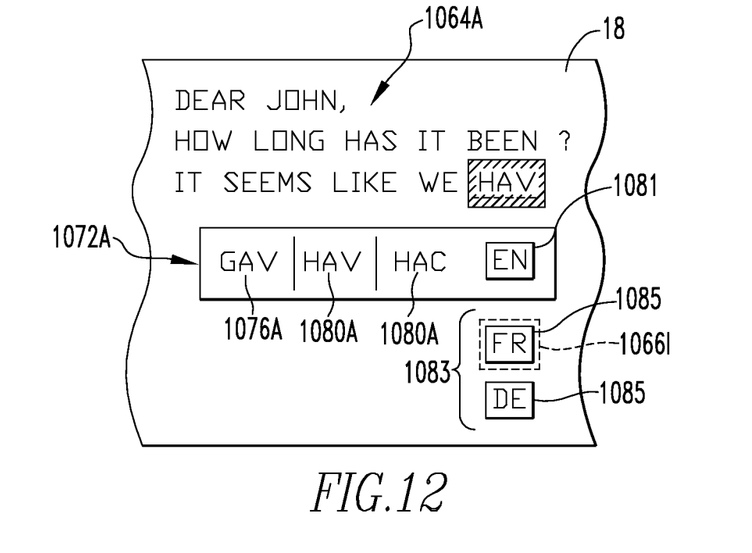
FIG. 12 is another output during another part of the exemplary text entry operation of FIG. 10.

As can be seen in FIG. 12, the value 1081 can be selected by the user to cause the displaying of a list 1083 of alternative values 1085. The alternative values 1085 are indicative of selectable alternative languages into which the disambiguation routine 44 can interpret ambiguous input. A selection of the value 1081 would have been achieved, for example, by the user providing horizontal scrolling inputs with the track ball 32 to cause (not expressly depicted herein) the indicator 1066 to be disposed over the value 1081, and by thereafter translating the track ball 32 toward the housing 6 to provide a selection input.

The alternative values 1085 in the list 1083 are vertically arranged with respect to one another and with respect to the value 1081. As such, a vertical scrolling input with the track ball 32 can result in a vertical movement of the indicator 10661 to a position on one of the alternative values 1085 which, in the present example, is the alternative value 1085 "FR", which is representative of the French language. The alternative value 1085 "FR" could become selected by the user in any of a variety of fashions, such as by actuating the track ball 32 again, by continuing to enter text, or in other fashions. It thus can be understood from FIG. 11 and FIG. 12 that the track ball 32 can be rotated to provide horizontal scrolling inputs and, when appropriate, to additionally provide vertical scrolling inputs and, when appropriate, to additionally provide selection inputs, for example.

Figure 13:
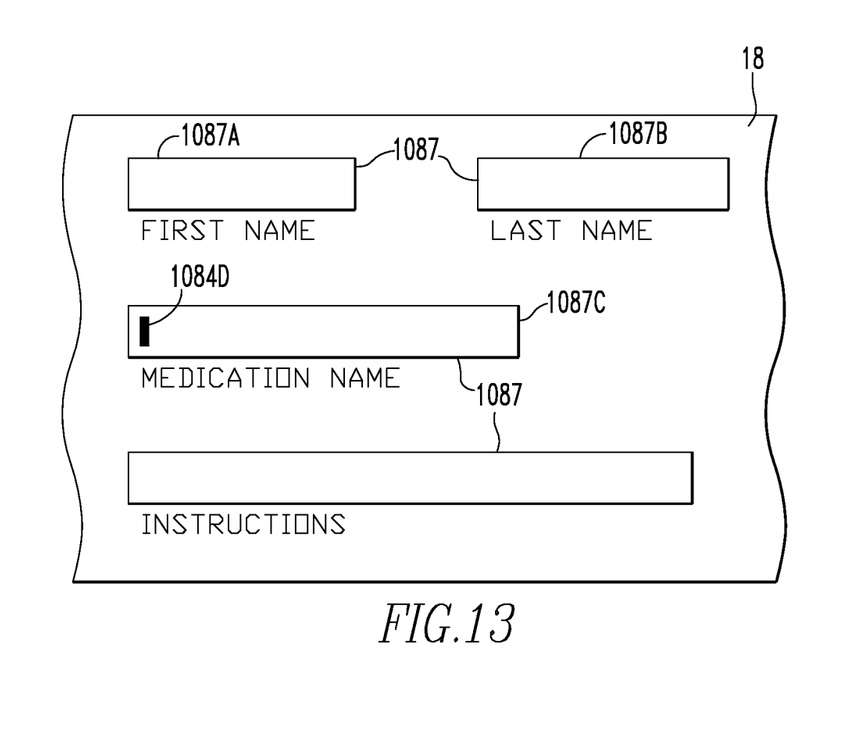
FIG. 13 is an exemplary output during a data entry operation.

FIG. 13 depicts another exemplary output on the display 18 such as might be employed by a data entry routine 44. The exemplary output of FIG. 13 comprises a plurality of input fields 1087 with corresponding descriptions. A cursor 1084D, when disposed within one of the input fields 1087, indicates to the user that an input focus of the handheld electronic device 4 is on that input field 1087. That is, data such as text, numbers, symbols, and the like, will be entered into whichever input field 1087 is active, i.e., is the subject of the input focus. It is understood that the handheld electronic device 4 might perform other operations or take other actions depending upon which input field 1087 is the subject of the input focus.

Navigational inputs from the track ball 32 advantageously enable the cursor 1084D, and thus the input focus, to be switched, i.e., shifted, among the various input fields 1087. For example, the input fields 1087 could include the input fields 1087A, 1087B, and 1087C. FIG. 13 depicts the cursor 1084D as being disposed in the input field 1087C, indicating that the input field 1087C is the subject of the input focus of the handheld electronic device 4. It is understood that the cursor 1084D, and thus the input focus, can be shifted from the input field 1087C to the input field 1087A, which is disposed adjacent and vertically above the input field 1087C, by providing a vertical scrolling input in the upward direction with the track ball 32. That is, the track ball 32 would be rotated the predetermined rotational distance about the horizontal axis 34. Similarly, the cursor 1084D, and thus the input focus, can be shifted from the input field 1087A to the input field 1087B, which is disposed adjacent and to the right of the input field 1087A, by providing a horizontal scrolling input to the right with the track ball 32. That is, such a horizontal scrolling input could be provided by rotating the track ball the predetermined rotational distance about the vertical axis 34B. It thus can be seen that the track ball 32 is rotatable in a plurality of directions about a plurality axes to provide navigational, scrolling, and other inputs in a plurality of directions among a plurality of input fields 1087. Other types of inputs and/or inputs in other applications will be apparent.

Figure 14:
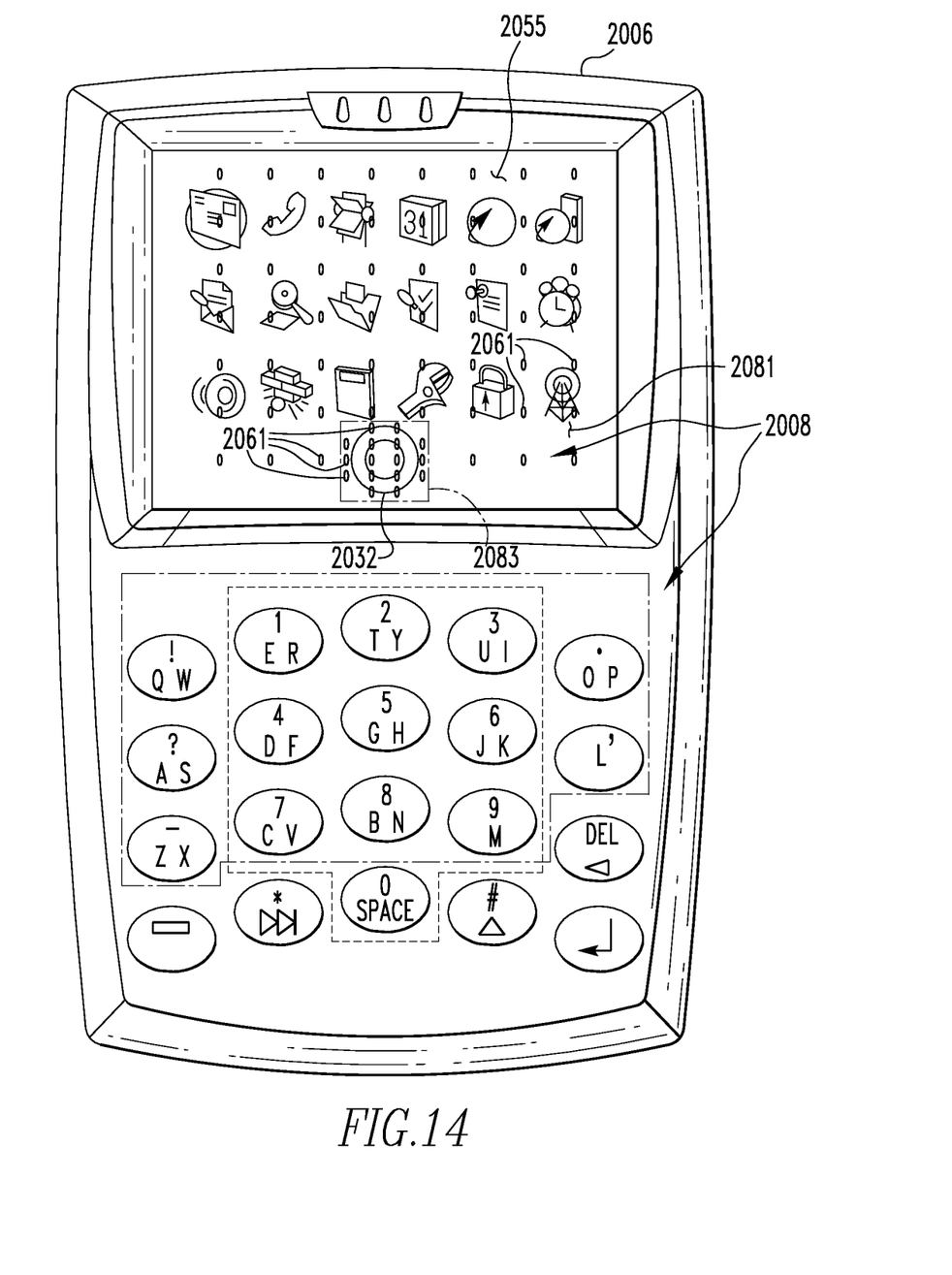
FIG. 14 is a top plan view of an improved handheld electronic device in accordance with another embodiment of the disclosed and claimed concept.
Figure 15:
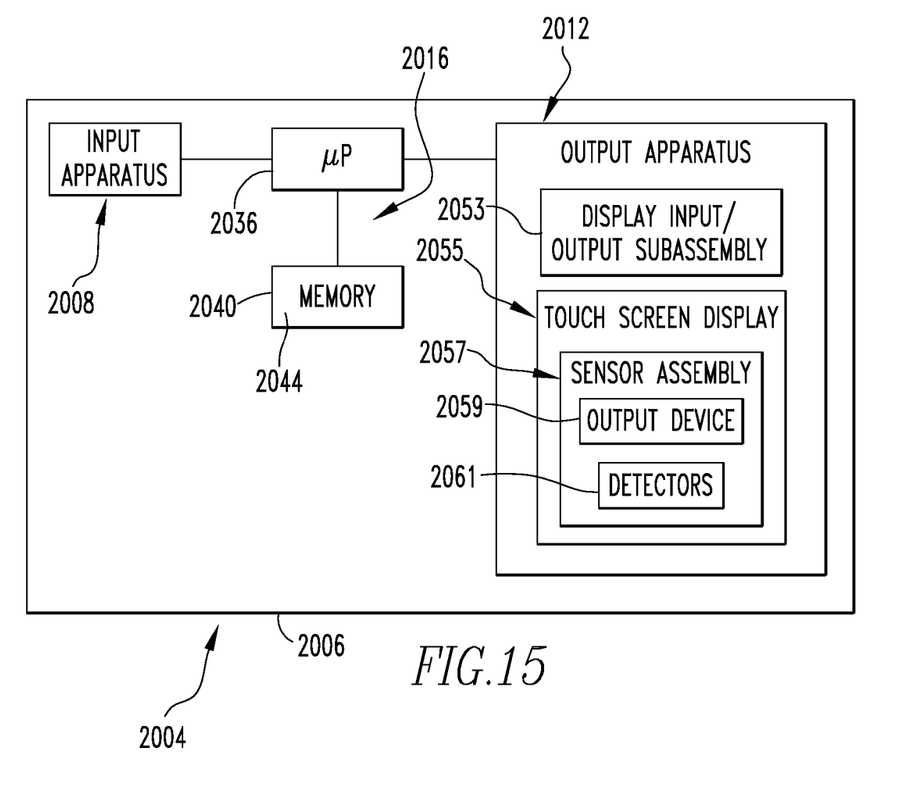
FIG. 15 is a schematic depiction of the improved handheld electronic device of FIG. 14.

An improved handheld electronic device 2004 in accordance with still another embodiment of the disclosed and claimed concept is depicted generally in FIG. 14 and FIG. 15. The handheld electronic device 2004 includes a housing 2006 upon which are disposed an input apparatus 2008, an output apparatus 2012, and a processor apparatus 2016. The processor apparatus 2016 comprises a processor 2036 a memory 2040 having stored therein a number of routines 2044. All of the operations that can be performed on or with the handheld electronic device 4 can be performed on or with the handheld electronic device 2004. As such, the features of the handheld electronic device 2004 that are common with the handheld electronic device 4, and this would comprise essentially all of the features of the handheld electronic device 4, will generally not be repeated.

As a general matter, the handheld electronic device 2004 is substantially identical in configuration and function to the handheld electronic device 4, except that the handheld electronic device 2004 includes a touch screen display 2055 that provides a non-mechanical multiple-axis input device 2032 instead of the track ball 32. The non-mechanical multiple-axis input device 2032 can be said to be in the form of a virtual track ball 2032.

As is generally understood, the touch screen display 2055 includes a liquid crystal layer between a pair of substrates, with each substrate including an electrode. The electrodes form a grid which defines the aperture size of the pixels. When a charge is applied to the electrodes, the liquid crystal molecules of the liquid crystal layer become aligned generally perpendicular to the two substrates. A display input/output subassembly 2053 of the output apparatus 2012 controls the location of the charge applied to the electrodes thereby enabling the formation of images on the touch screen display 2055.

Additionally, the touch screen display 2055 comprises a sensor assembly 2057 which comprises an output device 2059 and a plurality of detectors 2061. The detectors 2061 are shown schematically and are typically too small to be seen by the naked eye. Each detector 2061 is in electrical communication with the output device 2059 and creates an output signal when actuated. The detectors 2061 are disposed in a pattern, discussed below, and are structured to detect an external object immediately adjacent to, or touching, the touch screen display 2055. The external object is typically a stylus or a user's finger (not shown). The output device 2059 and/or the processor 2016 are structured to receive the detector signals and convert the signals to data representing the location of the external object relative to the touch screen display 2055. As such, while the sensor assembly 2057 is physically a component of the touch screen display 2055, it is nevertheless considered to be a logical component of the input apparatus 2008 since it provides input to the processor apparatus.

The detectors 2061 are typically capacitive detectors, optical detectors, resistive detectors, or mechanical detectors such as strain gauge or charged grid, although other technologies may be employed without departing from the present concept. Typically, capacitive detectors are structured to detect a change in capacitance caused by the electrical field of the external object or a change in capacitance caused by the compression of the capacitive detector. Optical detectors are structured to detect a reflection of light, e.g., light created by the touch screen display 2055. Mechanical detectors include a charged grid with columns that would be disposed on one side of the touch screen display 2055 and a corresponding grid without columns would be disposed at another location on the touch screen display 2055. In such a configuration, when the touch screen display 2055 is compressed, i.e. as a result of being touched by the user, the columns at the area of compression contact the opposing grid thereby completing a circuit.

Capacitive detectors may be disposed upon either substrate and, although small, require space. Thus, and any pixel that is disposed adjacent a detector 2061 will have a reduced size, or aperture, to accommodate the adjacent detector 2061.

The detectors 2061 are disposed in a pattern, and at least some of the detectors 2061 preferably are arranged in lines that form a grid. A first portion of the detectors 2061 are disposed on a first area 2081 of the touch screen display 2055, and a second portion of the detectors 2061 are disposed on a second area 2083 of the touch screen display 2055. As can be seen from FIG. 14, the first area 2081 essentially is every region of the touch screen display 2005 other than the second area 2083.

The first portion of the detectors 2061 disposed on the first area 2081 of the touch screen display 2055 are disposed in a relatively sparse pattern in order to minimize the visual interference that is caused by the presence of the detectors 2061 adjacent the pixels. Preferably, the spacing of the detectors 2061 on the first area 2081 is between about 1.0 mm and 10.0 mm between the detectors 2061, and more preferably about 3.0 mm between the detectors 2061.

The second portion of the detectors 2061 are disposed in a relatively dense pattern on the second area 2083 of the touch screen display 2055 and are structured to support the function of the virtual track ball 2032. The image quality in the second area 2083 of the touch screen display 2055 is adversely affected due to the dense spacing of the detectors 2061 there. However, the second area 2083 is a relatively small area compared to the entire touch screen display 2055. Preferably, the density of the detectors 2061 in the second area 2083 is between about 0.05 mm and 3.0 mm between the detectors, and more preferably about 0.1 mm between the detectors 2061. Further, because the pixels in the second area 2083 are dedicated for the virtual track ball 2032, it is acceptable to have a reduced pixel density with larger pixels. Since the pixel size would be very large, the aspect ratio would be significantly higher than that of pixels that are not disposed adjacent a detector 2061. The pixels in the second area 2083 likely would be special function pixels, such as pixels that would both depict the virtual track ball 2032 and that would light up the second area 2083 to highlight the virtual track ball 2032.

The processor apparatus is structured to create images and define the boundaries of selectable portions of the images on the touch screen display 2055. For example, the processor apparatus will create the images of selectable icons or other objects on specific portions of the touch screen display 2055. The processor apparatus is further structured to relate specific detectors 2061 to the specific portions of the touch screen display 2055. Thus, when the processor apparatus detects the actuation of a specific detector 2061 adjacent to a specific image, e.g. a selectable icon, the processor apparatus will initiate the function or routine related to that icon, e.g. opening a calendar program.

Similarly, the processor apparatus is structured to employ specific detectors 2061 to support the function of the virtual track ball 2032 in the second area 2083 of the touch screen display 2055. Thus, actuations of one or more of the detectors 2061 that support the virtual track ball 2032 will be interpreted by the processor apparatus as being inputs from the virtual track ball 2032. For instance, an actuation of a sequential plurality of detectors 2061 extending along a particular direction on the touch screen display 2055 in the second area 2083 might be interpreted as a navigational input, a scrolling input, a selection input, and/or another input in the particular direction. Since the user can freely move a finger, for instance, in any direction on the touch screen display 2055, the virtual track ball 2032 is a multiple-axis input device. Other inputs, such as a non-moving actuation of one or more detectors 2061 in the central region of the virtual track ball 2032 could be interpreted by the processor apparatus as an actuation input of the virtual track ball 2032, such as would be generated by an actuation of the track ball 32 of the handheld electronic device 1004 in a direction toward the housing 1006 thereof. It can be understood that other types of actuations of the detectors 2061 in the second area 2083 can be interpreted as various other inputs without departing from the disclosed and claimed concept.

The handheld electronic device 2004 thus comprises a multiple-axis input device 2032 that is non-mechanical but that still provides the same functional features and advantages as, say, the track ball 32 of the handheld electronic device 4. It is understood that the virtual track ball 2032 is but one example of the many types of multiple-axis input devices that could be employed on the handheld electronic device 2004.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling input on a handheld electronic device that comprises an output apparatus, an input apparatus comprising a plurality of input members, and a processor apparatus, the method comprising:
   detecting selection of one or more input members of the input apparatus;
   determining one or more disambiguated objects corresponding to the one or more input members by searching data stored on the handheld electronic device; providing one or more of the disambiguated objects;
   detecting selection of a displayed object from the one or more provided disambiguated objects;
   detecting a predetermined input when an edit focus of the processor apparatus is on a character of the displayed object, the character being assigned to an input member having a plurality of characters assigned thereto;
   responsive to the predetermined input, modifying the displayed object by replacing the character with a different character assigned to the input member, the modified displayed object being different than each of the one or more disambiguated objects; and
   detecting a second selection of an input member having a number of characters assigned thereto and responsive thereto:
   inserting a non-delimiter character of the number of characters at a position of the edit focus in the modified displayed object; and
   exiting an edit mode on the handheld device.

2. The method of claim 1, further comprising, responsive to the predetermined input, moving the edit focus to another character disposed adjacent the different character.

3. The method of claim 2, further comprising:
   detecting as the predetermined input a navigational input in one direction and another navigational input in another direction different than the one direction; and
   responsive to the another navigational input, initiating the moving of the edit focus.

4. The method of claim 3, further comprising detecting as the navigational input a rotation of a multiple-axis input member a predetermined rotational distance about a first axis and detecting as the another navigational input a rotation of a multiple-axis input member the predetermined rotational distance about a second axis different than the first axis.

5. The method of claim 3, further comprising displaying the different character at a location disposed in a first direction from the character, and detecting as the navigational input a navigational input in the first direction.

6. The method of claim 5, further comprising detecting as the another navigational input a navigational input in a direction generally perpendicular to the first direction.

7. The method of claim 6, further comprising detecting as the another navigational input a navigational input in the direction of the another character.

8. The method of claim 1, further comprising:
   displaying an alternate character when an edit focus of the processor apparatus is on a first character of the displayed object, the given character and the alternate character being assigned to an input member;
   detecting a navigational input in a direction toward a second character of the displayed object;
   moving the edit focus from the first character onto each successively adjacent character of the displayed object until the edit focus is on the second character; and
   when the edit focus is on any given character, displaying a separate character assigned to the same input member as the given character.

9. The method of claim 1, further comprising detecting as the predetermined input a rotation of a multiple-axis input member plus a translation of the multiple-axis input member.

10. The method of claim 1, further comprising:
    responsive to exiting the edit mode, determining whether the modified displayed object conflicts with a conflicting word in a database;
    responsive to determining that the modified displayed object conflicts with a conflicting word, determining whether the conflicting word lacks a sticky flag; and
    responsive to determining that the conflicting word lacks a sticky flag, deleting the conflicting word from the database.

11. The method of claim 10, further comprising:
    determining whether the modified displayed object is already stored in the database; and
    responsive to determining that the modified displayed object is not already stored in the database, adding the modified displayed object to the database with a sticky flag.

12. The method of claim 10, further comprising:
    if the modified displayed object does not conflict with a conflicting word in the database, determining whether the modified displayed object is already stored in the database; and
    responsive to determining that the modified displayed object is not already stored in the database, adding the modified displayed object to the database with a sticky flag.

* * * * *